Nov. 30, 1926.

R. RADDATZ 1,608,959

DUMPING MECHANISM

Filed Nov. 1, 1919   2 Sheets-Sheet 1

Inventor
Richard Raddatz
By Erwin Wheeler & Woolard
Attorneys.

Nov. 30, 1926.
R. RADDATZ
1,608,959
DUMPING MECHANISM
Filed Nov. 1, 1919   2 Sheets-Sheet 2
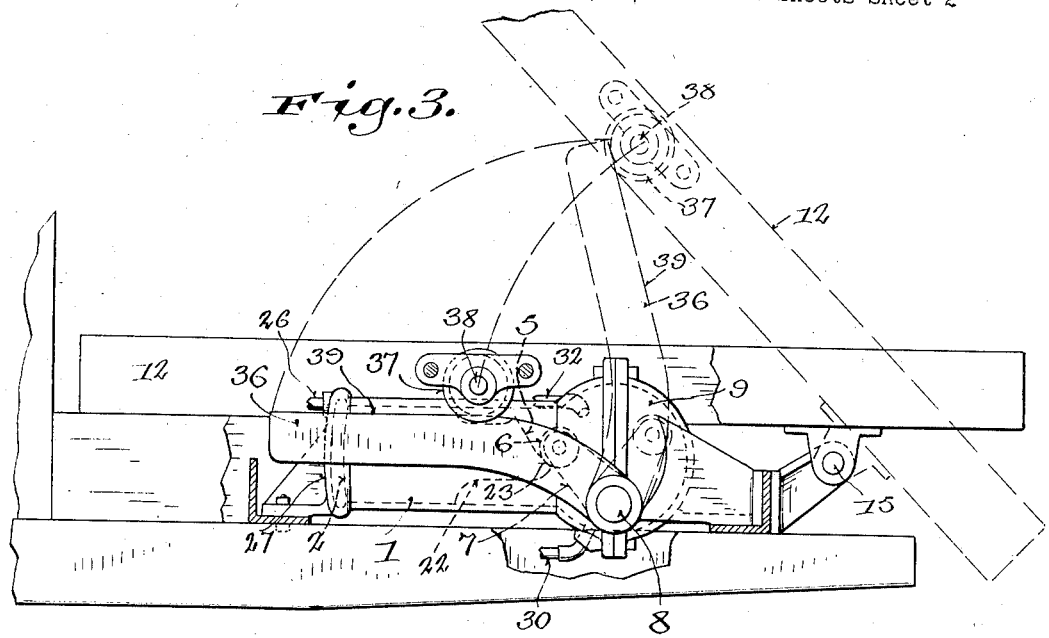
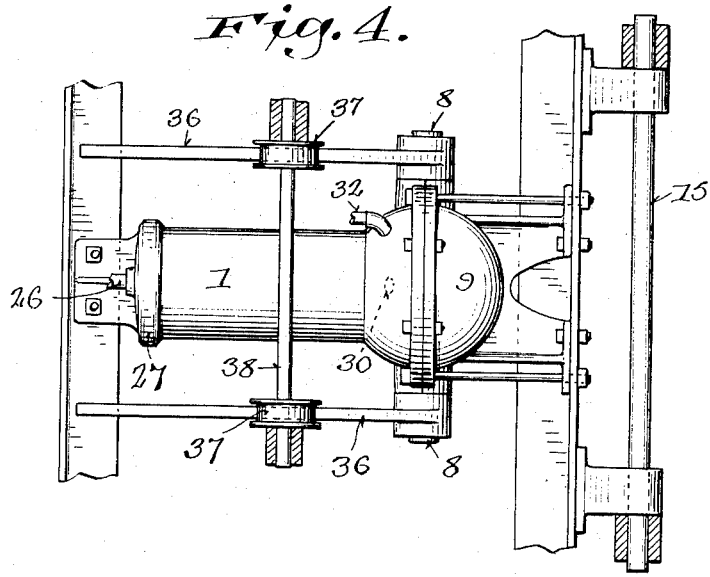
Inventor
Richard Raddatz
By Erwin, Wheeler & Woolard
Attorneys.

Patented Nov. 30, 1926.

1,608,959

UNITED STATES PATENT OFFICE.

RICHARD RADDATZ, OF MILWAUKEE, WISCONSIN.

DUMPING MECHANISM.

Application filed November 1, 1919. Serial No. 335,211.

My invention relates to improvements in dumping mechanisms for vehicles including motor trucks, railway cars, and other vehicles, with particular reference to mechanisms operated by hydraulic power. Manufacturers and users of such vehicles insist upon certain requirements as to location and as to space, which involve placing the hydraulic cylinder or jack in a horizontal position between the main frame and the body of the vehicle and connecting the piston or pistons with the body in such a manner that the connections can fold when the piston is retracted, and allow the entire apparatus to occupy a space directly below the body, and above the bottom of the main frame. In fact, it is desirable that all parts of the lifting mechanism be located above the central horizontal plane of the frame bars.

In some devices of the described class as heretofore constructed, the weight of the body and its load is carried by the actuating connections in such a manner as to offer a very great resistance to the piston actuating liquid, pump, and motor, during the initial stages of the dumping movement, followed by a rapid decrease in such resistance during the succeeding stages, as the center of gravity approaches the vertical plane of the pivotal axis upon which the body swings to its dumping position.

The object of this invention is to provide means for distributing the work or resistance offered by the load and the body in such a manner that the load upon the motor, the pump, and the jack may be substantially or nearly uniform thruout the major portion of the body lifting, swinging, or dumping operation; to provide means whereby the body may be initially lifted and swung toward the dumping position slowly and with great power, the movement accelerating in inverse proportion to the load carried by the lifting connections until the body approaches the dumping position, after which the movement may be progressively retarded until the final dumping position is reached; to provide a structure of simple character to normally occupy minimum space with no depending members or projections extending materially below the central horizontal plane of the main frame; to provide simple and durable dumping mechanism which can be easily controlled and the dumping operation reglated to any desired degree, and to provide simple means for avoiding the difficulties heretofore experienced with foam and sediment in the operation of mechanisms of this type.

In the drawings—

Figures 3 and 4 are views similar to Figures 1 and 2, illustrating a modified form of construction having the same objects in view.

Like parts are identified by the same reference characters thruout the several views.

Figure 1:
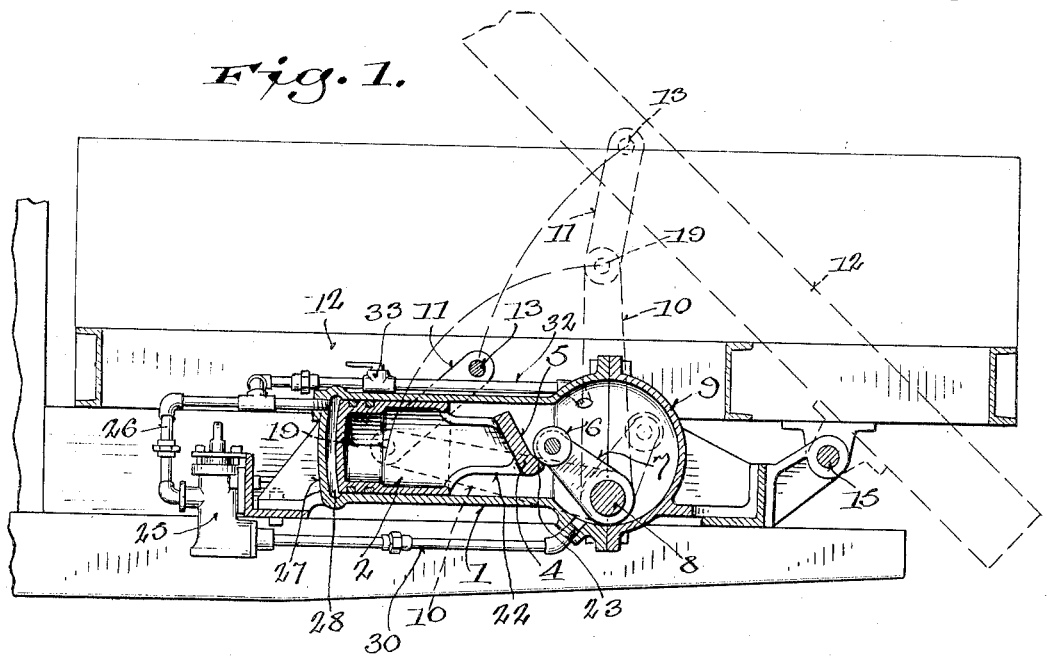
Figure 1 is a fragmentary view showing a portion of the main frame of a vehicle and a body supporting frame, with my improved dumping mechanism in position for use and with the jack cylinder illustrated in vertical section.

In Figure 1 the jack cylinder 1 is mounted upon the main frame with its axis horizontally and longitudinally disposed. A piston 2, contained within this cylinder, is provided with a crank actuating headpiece 4 having an inclined working face 5 adapted to engage an anti-frictional roller 6 carried by a crank 7 rigidly connected with the shaft 8. The crank 7 is enclosed within a casing member 9, preferably integral with the cylinder. The shaft projects thru this casing on each side and its respective end portions are provided with arms 10, each connected by links 11 with the side bars 12 of the body frame, these links being preferably pivoted to a cross shaft 13, the ends of which are mounted in said side bars 12.

The body frame is pivotally connected with the main frame at 15, whereby its front end may be lifted and swung to the dotted line position in which it is indicated in Fig. 1, with the rear end tipping downwardly for a dumping operation. This connection between the main frame and the body frame conforms to ordinary practice, but it will be observed that when the piston 2 is actuated rearwardly from its full line position in Fig. 1, the headpiece 4 will exert pressure upon the roller 6 not only along the line of piston movement, but it will also tend to push underneath the roller with a wedging action which will be very effective in causing the crank to swing upwardly and rearwardly in the arc of its oscillation with a varying mechanical advantage as the crank moves upwardly, thereby varying the resultant force of the wedge pressure, and the length of the moment arm simultaneously with a shifting of the center of gravity of the load. The roller 6 is, of course, free to rotate and this allows it to travel without friction along the inclined face 5 of the actuating headpiece until it reaches its maximum position of relative elevation, with the crank in a vertical position, after which a continued oscillation of the shaft 8 will cause the roller to retract to some extent along the surface 5 of the headpiece, but this will occur at a time when the load is approaching the dumping position and the toggle action of the arms 10 and links 11 is most effective for transmission of power with minimum motion. It will be observed that during the initial stages of the body lifting operation the cross shaft 13 occupies a position a substantial distance to the rear of the pivotal connections 19 between the links 11 and the arms 10. The effect of this arrangement is, therefore, to carry the load initially upon relatively short arms connected with the transverse shaft 8, but as the weight of the load shifts to the pivotal axis 15, the links 11 swing toward a vertical position, the effective length of the arms 10 increases and during the middle portion of the stroke a considerable acceleration in the swinging movement of the body takes place, due to the relative outward movement of the links. But on the approach of the toggle members 10 and 11 toward a position of alinement, the final swinging movement of the body is again retarded.

By employing a piston 2 which has a bearing area of considerable length upon the inner surface of the cylinder 1 and by providing a comparatively short connection 22 between the piston proper and the actuating head 4, the resultant line of reactionary pressure is brought well within the bearing surface of the piston. This avoids any injurious tendency to a displacement of the piston or the development of cramping effects within the cylinder due to the resultant pressures, developed by the wedging action of the head 4 as above described. I preferably vary the inclination of the lower portion of the inclined surface 5 as indicated at 23, this portion of said surface being more nearly horizontal than the portion above it, whereby the lifting action is most effective while overcoming the inertia of the body and its load,—i. e., during the initial stages of the dumping movement.

The pump 25 may be assumed to be of any ordinary type adapted to discharge oil or other liquid into the cylinder 1 thru a duct 26. The cylinder head 27 is preferably enlarged, and provided with a cavity 28, the lower portion of which, is depressed below the inner surface of the cylinder proper, and in the construction, shown this cavity is an annular cavity of somewhat greater diameter than that of the piston receiving portion of the cylinder. The inlet duct 26 connects with this cavity at the top, and I have illustrated a connection 30 between the crank case 9 and the pump along the under side of the cylinder, adapted to allow the pump to draw liquid from the crank case and force it into the cylinder thru the duct 26. Another duct 32 connects duct 26 with the crank case along the upper side of the cylinder, but the flow of liquid thru this duct is controlled by a manually operable valve at 33. After the vehicle body has been raised to dumping position this valve 33 may be opened to allow the body to return by gravity to its normal or load receiving position. The degree to which the valve is opened will, of course, determine the rapidity of this movement. It is, also, possible for the operator to partially open this valve during any stage of the dumping operation if it should appear that the movement of the body is too rapid.

I attach considerable importance to the location of the return duct 32 above the cylinder 1 and to the arrangement of this duct as a means of communication between the upper portion of the cylinder and the crank case, whereas the supply duct of the pump extends along the under side of the cylinder and connects the bottom portion of the crank case with the pump. This arrangement allows any foam developed during the pumping operation to pass out of the cylinder in advance of the oil, and in the next operation no foam will be drawn into the pump for the reason that it would necessarily be at the top of the oil in the crank case, whereas the pump supply connection leads from the bottom of the said case.

Figure 2:
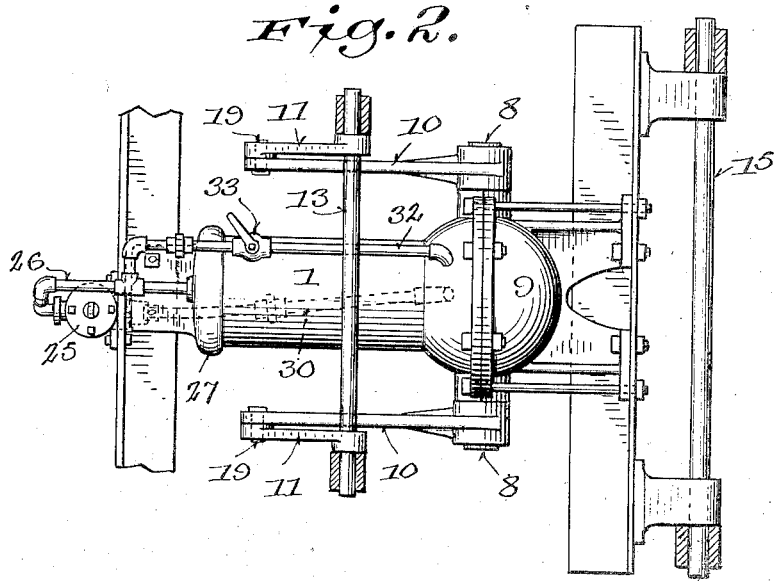
Figure 2 is a plan view of the same with the body frame and body removed.

Referring now to Figs. 3 and 4, it will be observed that the construction is the same as that disclosed in Figs. 1 and 2, and the same reference characters are applied to the corresponding parts except that in place of the arms 10 and links 11 shown in Figs. 1 and 2, I provide the crank shaft 8 with more extended arms 36, each adapted to bear against a roller 37 journalled on a cross shaft 38 corresponding with the cross shaft 13 in Figs. 1 and 2. The bearing margins or working faces 39 of the arms 36 are in a horizontal plane when the arms are in normal position. This necessitates curving the rear ends of the arms so that they may be connected with the oscillatory crank shaft 8 at the lower level which that shaft occupies in order to allow clearance for the crank arm 7. In the structure shown in Figs. 3 and 4, the operation is substantially the same as in Figs. 1 and 2 as above explained except that during the intermediate portion of the movement the acceleration is not as great and there is no such retarding action during the final portion of the movement as is the case where the structure disclosed in Figs. 1 and 2 is used. For these reasons and also for the reason that the structure disclosed in Figs. 1 and 2 positively limits the swinging movement of the body, I prefer the structure first described, altho in all other particulars, the modified structure is a substantial equivalent.

It will be observed that the inclination of the bearing surfaces of the arms 36 to a radial line extending from the crank shaft thru the connection of the arm therewith is a factor in determining the rate of movement of the body at any given stage of the dumping operation. Therefore, by varying the inclination of said bearing surface along any given portion of the arm the degree of acceleration may be varied in accordance with the requirements for any given installation, but ordinarily the arrangement will be such as to distribute the load upon the motor with substantial uniformity during the major portion of the dumping operation, and in fact, during all portions of the movement except the final body retarding movement.

Briefly reviewing the operation of my improved mechanism it will be understood that the pump may be actuated from the engine motor, any other suitable source of power to draw liquid from the crank case thru the connection or duct 30 and force it into the cylinder thru the duct 26, the valve 33 being closed under normal conditions. After the body has been raised to dumping position the pump will ordinarily be stopped and the body will be held in the raised position by the liquid until the valve 33 is opened to allow the liquid in the cylinder to return to the crank case. If desired, however, the valve may be partially opened during the final or any stage of the body lifting movement and the liquid may then be allowed to circulate. Under these conditions, the pump might continue to operate after the tilting movement of the body has been completed, but in modern practice it is common to provide means whereby the body in its final lifting movement disconnects the pump from the motor or provides automatic means for allowing the liquid to circulate. Such constructions being in common use and form no part of my invention, it is unnecessary to illustrate them in the drawings of this application.

I claim:

1. Dumping mechanism for vehicles, including the combination with a crank, mechanism operatively arranged to actuate the vehicle body, of a reciprocatory wedge, adapted to engage and actuate the crank, and power connections for actuating the wedge.

2. Dumping mechanism for vehicles, including the combination with a crank, mechanism operatively arranged to actuate the vehicle body, of a reciprocatory wedge, adapted to engage and actuate the crank, and means for actuating the wedge, along a line which is a secant to the crank, said crank having a bearing member in movable engagement with the working face of the wedge.

3. Dumping mechanism for vehicles, including the combination with a crank, mechanism operatively arranged to actuate the vehicle body, of a reciprocatory wedge, adapted to engage and actuate the crank, and hydraulic means for actuating the wedge, said wedge having an inclined bearing surface adapted to engage and lift the crank arm while pushing against it along a secant line of the arc in which the crank arm swings.

4. Dumping mechanism for vehicles, including the combination with a crank shaft having an arm operatively arranged to actuate the vehicle body at accelerating speed during the first portion of its dumping movement, and while the motor is being operated at substantially uniform speed, said shaft being provided with a power receiving arm, and hydraulic actuating means including a pushing head having an inclined surface adapted to bear against said arm, and cause it to swing while moving along a line which is a secant to the arc of swinging movement.

5. Dumping mechanism for vehicles including the combination with an oscillatory power receiving crank arm, a cooperating load arm connected to oscillate therewith, a load carrying member, a folding toggle link connection between the load arm and load carrying member adapted as the load carrying member is actuated to initially extend the effective radius of the load arm and then swing toward a position of alignment with said load arm, and means for actuating the power receiving crank arm with maximum initial and progressively decreasing mechanical advantage.

6. In a dumping mechanism, the combination with a tiltable load carrying body, a crank having an arm operatively connected to lift the body with relatively varying speed, and crank actuating mechanism adapted to actuate the crank with varying mechanical advantage.

7. Dumping mechanism for vehicle bodies, including the combination with a crank shaft having an arm operatively arranged to actuate the vehicle body, of a cylinder provided with a piston, a power receiving arm connected with the crank shaft, and a head piece connected with the piston and provided with an inclined bearing surface adapted to engage the power receiving arm, and to press against the arm directly along a secant line of the arc in which the arm swings and indirectly with a wedging action outwardly from said line along the curve of such arc.

8. Dumping mechanism for vehicle bodies, including the combination with a crank shaft having an arm operatively arranged to actuate the vehicle body, of a cylinder provided with a piston, a power receiving arm connected with the crank shaft, and a headpiece connected with the piston and provided with an inclined bearing surface adapted to engage the power receiving arm, and to press against the arm directly along a secant line of the arc in which the arm swings and indirectly with a wedging action outwardly from said line along the curve of such arc, and connections between said shaft and the vehicle body, adapted to transmit the motion of the shaft with relatively accelerating speed to the body during the major portion of the dumping movement.

9. Dumping mechanism for vehicles including the combination with a main frame and a tilting body pivotally connected therewith, of a horizontally disposed cylinder carried by the main frame and provided with a crank case, a crank shaft extending transversely thru the case and provided with end arms linked to the body and also having a power receiving arm enclosed in the crank case, a piston in the cylinder and adapted to actuate the power receiving arm.

10. Dumping mechanism for vehicles including the combination with a main frame and a tilting body pivotally connected therewith, of a horizontally disposed cylinder carried by the main frame and provided with a crank case, a crank shaft extending transversely thru the case and provided with end arms linked to the body and also having a power receiving arm enclosed in the crank case, a piston in the cylinder and adapted to actuate the power receiving arm, a pump arranged to draw liquid from the bottom portion of the crank case and deliver it to the working end of the cylinder and a valved return duct leading from the crank case, above the axis of the cylinder to the inlet thereof.

11. Dumping mechanism for vehicles including the combination with a main frame and a tilting body pivotally connected therewith, of a horizontally disposed cylinder carried by the main frame and provided with a crank case, a crank shaft extending transversely thru the case and provided with end arms linked to the body and also having a power receiving arm enclosed in the crank case, a piston in the cylinder and adapted to actuate the power receiving arm, a pump arranged to draw liquid from the bottom portion of the crank case and deliver it to the working end of the cylinder and a valved return duct leading from the crank case, above the axis of the cylinder to the inlet thereof, the working end of the cylinder being enlarged to provide a sediment receiving pocket.

12. Dumping mechanism for vehicles including the combination with a main frame and a tilting body pivotally connected therewith, of a horizontally disposed cylinder carried by the main frame and provided with a crank case, a crank shaft extending transversely thru the case and provided with end arms linked to the body and also having a power receiving arm enclosed in the crank case, a piston in the cylinder and adapted to actuate the power receiving arm, the link connections between the body and the body lifting arms being adapted to fold upon such arms when the body is in normal position.

13. In a dumping mechanism, a swinging body actuating member having a crank arm and an unconnected actuating member provided with an inclined face adapted to move with a wedging action against and underneath said arm to lift and swing the latter.

14. In a dumping mechanism, the combination with a tiltable load carrying body, a crank having a toggle arm connected with the body and adapted to lift with initial accelerating speed relative to that of the crank and with final reducing speed, and crank actuating mechanism adapted to actuate the crank with maximum initial and progressively reducing mechanical advantage.

15. In a device of the character described, the combination with a tiltable body, of a rotor provided with an arm, a link pivotally connected with said body and with said arm and adapted to comprise with said arm a toggle mechanism so positioned and proportioned as to tilt said body as said arm is rotated toward a position of extended alignment with said link and to lower said body as said arm is rotated toward a position of retracted alignment with said link, a reciprocable power operated member, and motion transmitting connections between said member and said rotor adapted to act on said rotor with varying mechanical advantage.

16. In a device of the character described, the combination with a tiltable body, of a rotor provided with an arm, a link pivotally connected with said body and with said arm and adapted to comprise with said arm a toggle mechanism so positioned and proportioned as to tilt said body as said arm is rotated toward a position of extended alignment with said link and to lower said body as said arm is rotated toward a position of retracted alignment with said link, a reciprocable power operated member, and motion transmitting connections between said member and said rotor adapted to act on said rotor with varying mechanical advantage, said connections including a crank movable approximately 90° from a position near to dead center.

17. In a device of the character described, the combination with a tiltable body, of a rotor provided with an arm, a link pivotally connected with said body and with said arm and adapted to comprise with said arm a toggle mechanism so positioned and proportioned as to tilt said body as said arm is rotated toward a position of extended alignment with said link and to lower said body as said arm is rotated toward a position of retracted alignment with said link, a reciprocable power operated member, and motion transmitting connections between said member and said rotor adapted to act on said rotor with varying mechanical advantage, said connections including a crank movable approximately 90° from a position near to dead center, and a reciprocable inclined plane adapted simultaneously to lift and push said crank.

In testimony whereof I affix my signature.

RICHARD RADDATZ.